(12) United States Patent
Bhattacharjee et al.

(10) Patent No.: US 9,286,201 B2
(45) Date of Patent: Mar. 15, 2016

(54) METHOD AND SYSTEM FOR AUTOMATIC SPACE ORGANIZATION IN TIER2 SOLID STATE DRIVE (SSD) CACHE IN DATABASES FOR MULTI PAGE SUPPORT

(71) Applicant: GLOBALFOUNDRIES INC., Grand Cayman (KY)

(72) Inventors: Bishwaranjan Bhattacharjee, Yorktown Heights, NY (US); Mustafa Canim, Ossining, NY (US); Kenneth A Ross, New York, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 136 days.

(21) Appl. No.: 14/036,965

(22) Filed: Sep. 25, 2013

(65) Prior Publication Data

US 2015/0089144 A1    Mar. 26, 2015

(51) Int. Cl.
| | |
|---|---|
| G06F 12/00 | (2006.01) |
| G06F 12/02 | (2006.01) |
| G06F 17/30 | (2006.01) |
| G06F 3/06 | (2006.01) |
| G06F 12/08 | (2006.01) |

(52) U.S. Cl.
CPC .............. *G06F 12/023* (2013.01); *G06F 17/30* (2013.01); *G06F 3/0628* (2013.01); *G06F 12/0223* (2013.01); *G06F 12/0802* (2013.01); *G06F 12/0886* (2013.01)

(58) Field of Classification Search
CPC .............. G06F 3/0628; G06F 12/0223; G06F 12/0802; G06F 12/0886

USPC ......... 711/103, 151, 154, 167, 133, 134, 145; 710/9, 36, 52, 60; 712/225
See application file for complete search history.

(56) References Cited

U.S. PATENT DOCUMENTS

| | | | |
|---|---|---|---|
| 7,594,093 B1 * | 9/2009 | Kancherla ..................... | 711/203 |
| 8,161,241 B2 | 4/2012 | Bhattacharjee | |
| 8,375,178 B2 | 2/2013 | Rana et al. | |
| 2003/0005257 A1 * | 1/2003 | Wilson et al. ................. | 711/205 |
| 2009/0055609 A1 | 2/2009 | Kuczynski et al. | |
| 2009/0164702 A1 * | 6/2009 | Kern ............................. | 711/103 |
| 2011/0173395 A1 * | 7/2011 | Bhattacharjee et al. ...... | 711/135 |
| 2011/0252210 A1 | 10/2011 | Davies | |
| 2012/0072652 A1 | 3/2012 | Celis et al. | |
| 2014/0075297 A1 * | 3/2014 | Gunturu ................ | G06F 17/217 715/251 |

OTHER PUBLICATIONS

Canim et al., "SSD Bufferpool Extensions for Database Systems," Proceedings of the VLDB Endowment VLDB Endowment Homepage archive vol. 3 Issue 1-2, Sep. 2010.
Storm et al., "Adaptive Self-Tuning Memory in DB2," VLDB '06, Sep. 12-15, 2006, Seoul, Korea.

(Continued)

*Primary Examiner* — Reba I Elmore
(74) *Attorney, Agent, or Firm* — Catherine Ivers; Andrew M. Calderon; Roberts, Mlotkowski, Safran & Cole PC (57) ABSTRACT

A system and method for adjusting space allocated for different page sizes on a recording medium includes dividing the recording medium into multiple blocks such that a block size of the multiple blocks supports a largest page size, and such that each of the multiple blocks is used for a single page size, and assigning an incoming page to a block based on a temperature of the incoming page.

17 Claims, 8 Drawing Sheets

(56) References Cited

OTHER PUBLICATIONS

Wang, "Storage Management in Large Distributed Object-Based Storage Systems," A dissertation submitted in partial satisfaction of the requirements for the degree of Doctor of Philosophy in Computer Science, University of California Santa Cruz Dec. 2006.

Lungu et al., "Practices for Designing and Improving Data Extraction in a Virtual Data Warehouses Project," Int. J. of Computers, Communications & Control, ISSN 1841-9836, E-ISSN 1841-9844 vol. III (2008), Suppl. issue: Proceedings of ICCCC 2008, pp. 369-374.

Oracle, Data base Admiiistrator's Guide 10g Release 1 (10.1).

* cited by examiner

METHOD AND SYSTEM FOR AUTOMATIC SPACE ORGANIZATION IN TIER2 SOLID STATE DRIVE (SSD) CACHE IN DATABASES FOR MULTI PAGE SUPPORT

BACKGROUND OF THE INVENTION

1. Field of the Invention

The present invention relates generally to relational database systems where solid state drives (SSDs) are used as an extension of main memory bufferpools. The invention may enable storing database pages with different page sizes in the same SSD file. An exemplary embodiment of the invention adjusts the space allocated to different page types automatically so that the hit ratio is improved.

2. Description of the Related Art

Conventional database systems support multiple page sizes for storing data records. DB2 for instance supports 4K, 8K, 16K and 32K pages. A database administrator can create multiple tablespaces with different page sizes to store different database objects. For example, a tablespace with 4K page size can be created to keep the indexes and another tablespace with 16K page size to keep the actual data records. The main memory bufferpools, however, cannot cater for multiple tablespaces created with different page sizes. For instance, an 8K main memory bufferpool can be used for multiple tablespaces with 8K pages only. If a tablespace is created with 16K pages, then a dedicated bufferpool with 16K pages should be created for this tablespace.

On the other hand, many database vendors are working on supporting SSDs as an extension of main memory bufferpools. To cater for multiple page size main memory bufferpools, the SSD file can be divided into constant size segments each serving a different main memory bufferpool. However, this approach is not preferable since the activity on different bufferpools may change overtime and the SSD space could be underutilized. In addition, this would affect the hit ratio in a negative way due to the changes in the workload over time. Alternatively, one can use a page fragmentation approach where a single file is used by different page size bufferpools. In this approach, every page can be divided into 4K chunks and stored in available 4K slots on the file.

SUMMARY OF THE INVENTION

Figure 1:
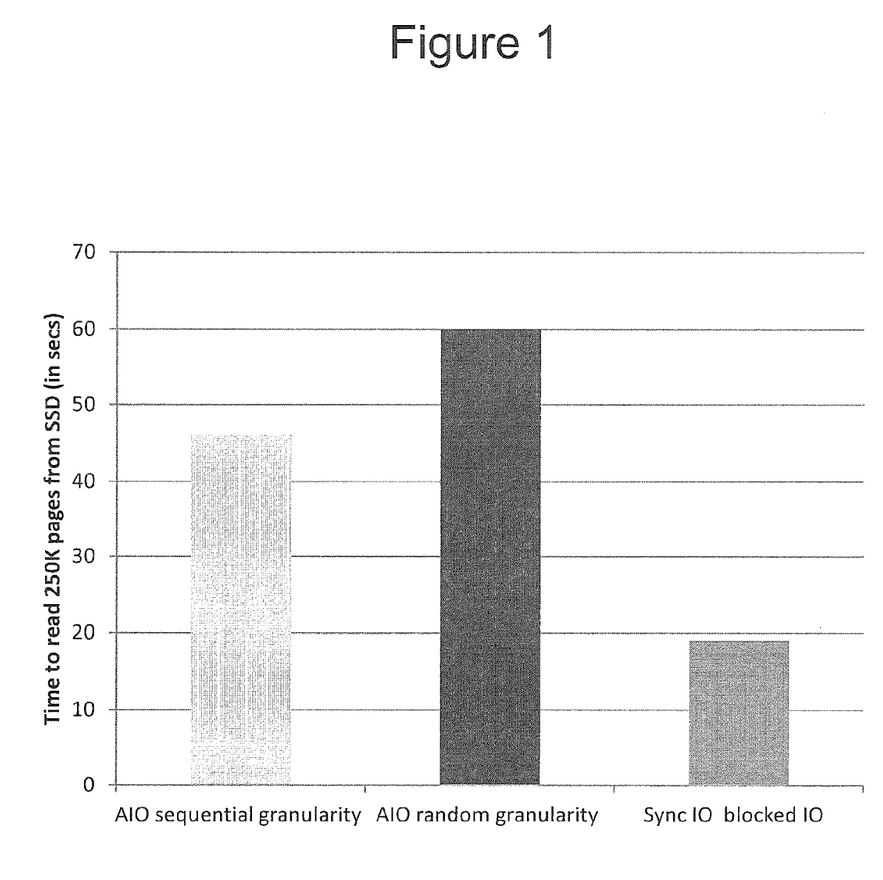
FIG. 1 illustrates results from reading 250K pages with mixed page sizes (4K, 8K, 16K, 32K) from an SSD with different I/O patterns.

However, experiments have shown that reading randomly placed small chunks from an SSD file is much slower than reading a bigger continuous data page in terms of both latency and throughput. For example, FIG. 1 illustrates the results from reading 250K pages with mixed page sizes (4K, 8K, 16K, 32K) from an SSD with different input/output (I/O) patterns.

In view of the foregoing, and other exemplary problems, drawbacks, and disadvantages of the conventional systems, it is an exemplary aspect of the present invention to provide a method and system for automatic space organization for multi-page support.

A first exemplary aspect of the invention, to achieve the above and other exemplary features and purposes described herein, is a method of adjusting space allocated for different page sizes on a recording medium. The method includes dividing the recording medium into multiple blocks such that a block size of the multiple blocks supports a largest page size and such that each of the multiple blocks is used for a single page size, and assigning an incoming page to a block based on a temperature of the incoming page.

Another exemplary aspect of the invention is a non-transitory computer-readable medium tangibly embodying a program of machine-readable instructions executable by an apparatus to perform a method of adjusting space allocated for different page sizes on a recording medium including dividing a recording medium into multiple blocks such that a block size of the multiple blocks supports a largest page size, and such that each of the multiple blocks is used for a single page size, and assigning an incoming page to a block based on a temperature of the incoming page.

Another exemplary aspect of the invention is a memory system including a recordable medium configured to store page data into page slots, a storage device configured to store the page data, a processor configured so as to divide the recordable medium into multiple blocks such that a largest page size is supported by a block size of the multiple blocks and such that each of the multiple blocks is used for a single page size, and assign an incoming page to a block of the multiple blocks based on a temperature of the incoming page.

The above aspects may allow the space allocated to different page types to be adjusted automatically while allowing a favorable hit ratio.

BRIEF DESCRIPTION OF THE DRAWINGS

The foregoing and other exemplary purposes, aspects and advantages will be better understood from the following detailed description of exemplary embodiments of the invention with reference to the drawings, in which.

DETAILED DESCRIPTION OF EXEMPLARY EMBODIMENTS OF THE INVENTION

Referring now to the drawings, and more particularly to FIGS. 2-8, there are shown exemplary embodiments of the method and structures according to the present invention.

For some applications, SSD's are proposed to be used as an extension of main memory bufferpools in relational databases. However, certain problems need to be tackled to use SSDs for that purpose. One of these problems is that main memory bufferpools might have different page sizes and storing these pages on an SSD file together would cause space fragmentation. This problem may be solved by automatically adjusting the space allocated for different page sizes on the SSD file while ensuring that the hit ratio on the SSD bufferpool does not get affected.

Figure 2:
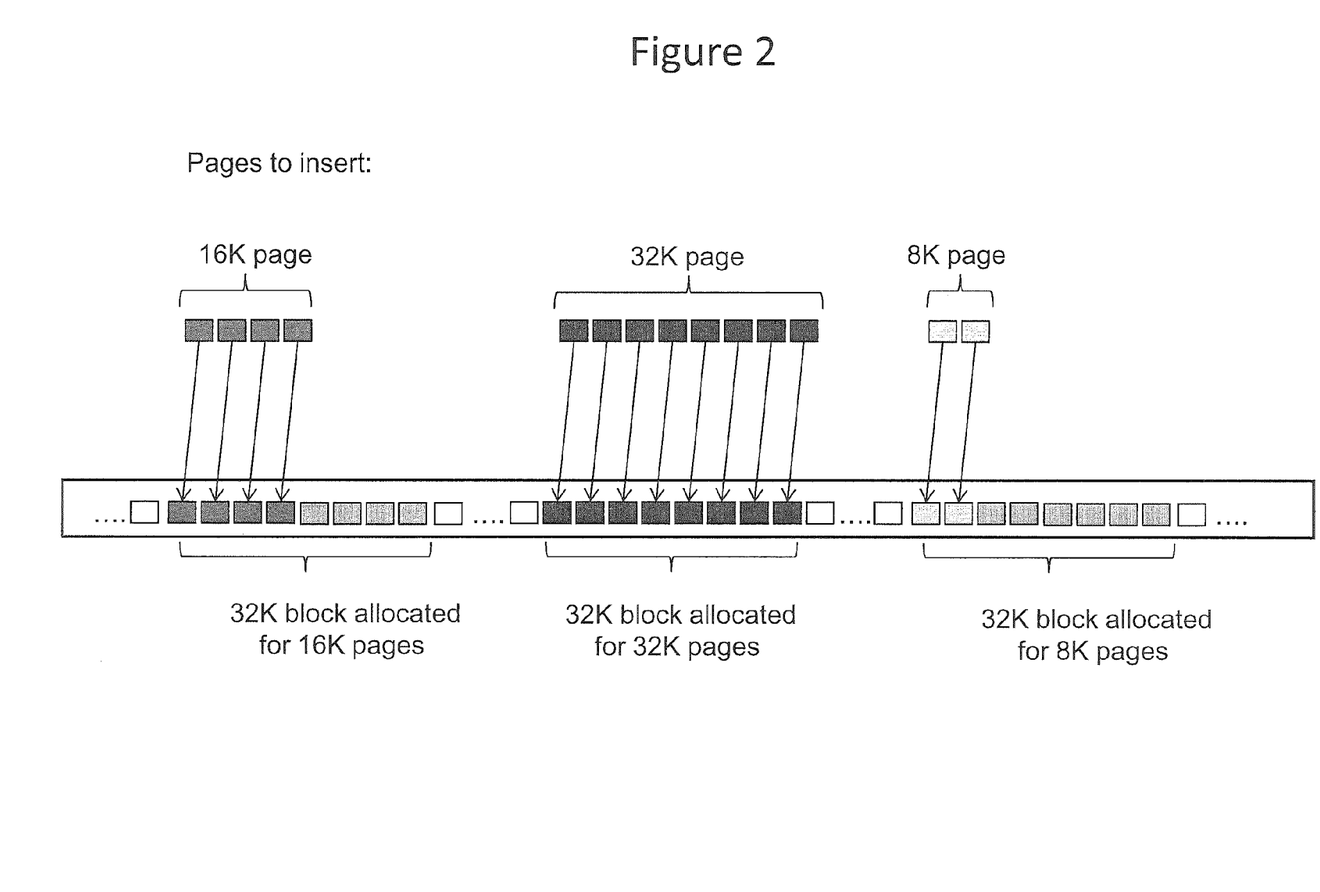
FIG. 2 illustrates an embodiment having 32K block sizes and 8K, 16K and 32K page sizes.

Based on this observation, in an exemplary embodiment of the invention, the SSD space is divided into the biggest page size supported, which is called a "single block". Each single block is used for a dedicated page size. For instance, in DB2® the biggest page size supported is 32K. Therefore, for example, the SSD file is divided into 32K blocks and each block is used for one of 4K, 8K, 16K or 32K pages as illustrated in FIG. 2.

A temperature-based decision mechanism can be used to determine which 32K blocks should be given to which page size. This approach leverages the temperature heap idea described in *SSD Bufferpool Extensions for Database Systems*, Proceedings of the VLDB Endowment, v.3 n.1-2, September 2010 (Mustafa Canim, George A. Mihaila, Bishwaranjan Bhattacharjee, Kenneth A. Ross, Christian A. Lang), the entire contents of which are incorporated herein by reference, to keep track of the temperatures of different regions stored on the SSD. In addition, U.S. Pat. No. 8,161,241 is directed to Temperature-Aware Buffered Caching For Solid State Storage, the entire content of which is incorporated herein by reference.

In "*SSD Bufferpool Extensions for Database Systems*", a "temperature" based page admission/eviction policy is proposed. The tablespaces in the database are divided into regions and temperature statistics are collected based on access frequency and patterns. A heap structure is used to maintain the pages stored in the SSD bufferpool and their temperatures. The page with the coldest temperature is held at the top of the heap with its SSD offset. When a page is read from the disk, its temperature is compared with the top element of the heap. If the temperature of the page read from disk is higher, the existing page is replaced with the incoming page and the heap structure is updated. This mechanism however assumes that all of the pages stored in the SSD file have the same page size. Below are described modifications to keep multiple page sizes in a single SSD file.

Figure 3:
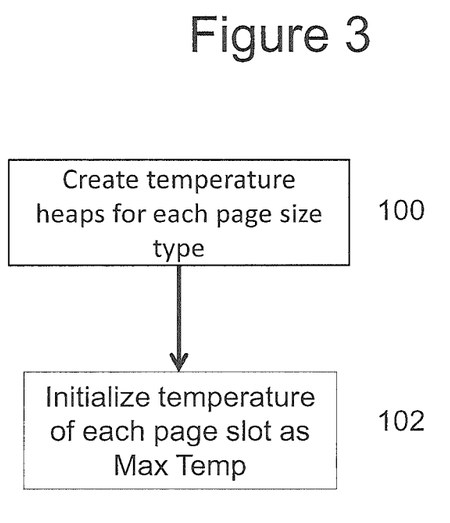
FIG. 3 illustrates initialization steps of an exemplary embodiment of the method.

FIG. 3 illustrates a pictorial representation of the initialization steps of an exemplary embodiment of the method. Instead of having a single temperature heap keeping track of the temperatures of the pages stored in the SSD, four temperature heaps (for this example) are created, each corresponding to four different page sizes (100). If the SSD space is divided into n 32K blocks, the 4K heap contains 8n heap elements, the 8K heap contains 4n elements, the 16K heap contains 2n elements and the 32K heap contains n elements. Each heap element contains a key (e.g., temperature) and a value (e.g., slot number in the SSD file space). Initially, all of the keys of the heap elements are assigned to the maximum value that the key data type can store (102). It should be ensured that the maximum value for the keys is never reached by accumulating temperatures for that particular region. Each value corresponds to a consecutive slot number in the SSD file space. So, for example, the values in the 4K heap would start from 0 and go up to 8n−1 assuming that the SSD file space is big enough to store $8n$ 4K pages. The values in the 8K heap would start from 0 and go up to 4n−1 since 4n 8K pages can be stored in the SSD file space. The 16K and 32K heap element values are also numbered respectively.

Figure 4:
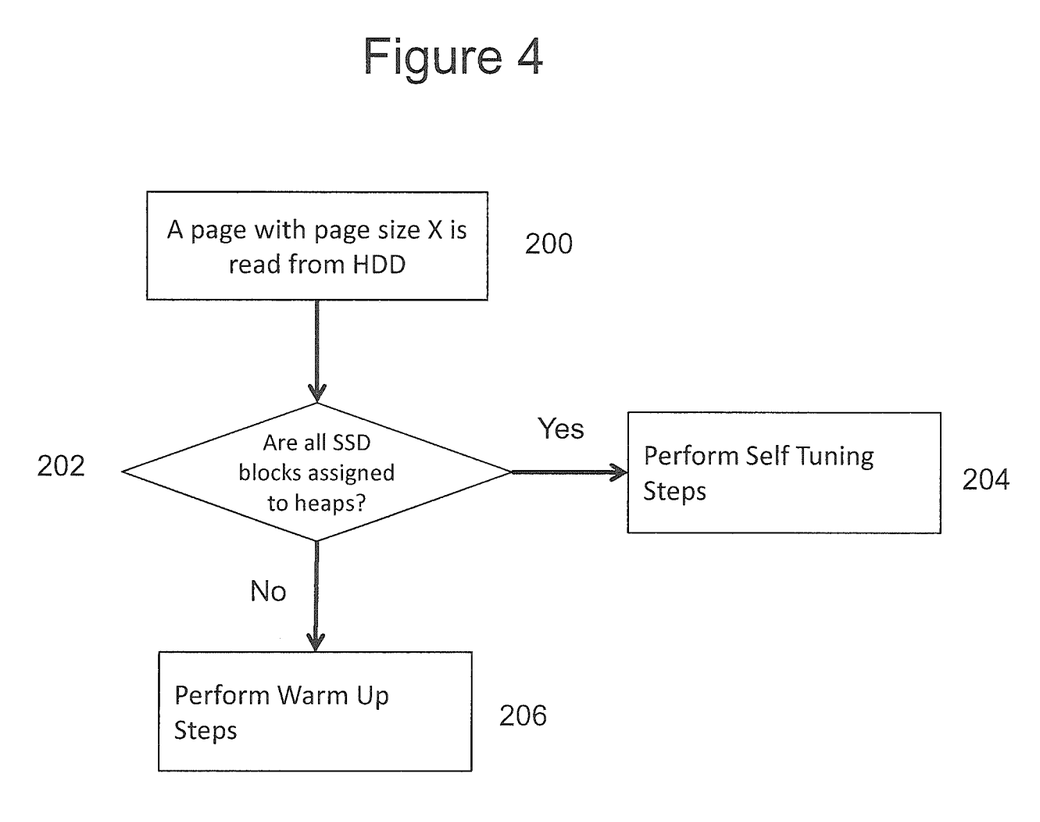
FIG. 4 illustrates exemplary steps taken when a page is retrieved from disk to the memory.

FIG. 4 illustrates steps of an exemplary embodiment of the method. When a new page is read from the disk (200), an admission decision is made to accept or reject the page into the SSD bufferpool. Initially, it is determined if all of the SSD blocks have been assigned to heaps (202). Depending on the page size of the page, the corresponding heap may be used to determine whether this page is warm enough to be accepted into SSD bufferpool.

There are two phases of the approach used in this exemplary embodiment. The first phase is called the "Warm Up phase" (206) and the second phase is called the Self Tuning phase (204). When the database is first started, the SSD file space is empty and ready to accept the incoming pages from the disk. Depending on the incoming page types, the 32K blocks are given to corresponding page size type(s) until the SSD space is filled up. This period is called Warm Up phase. In the Warm Up phase, no existing page is overwritten and all incoming pages are accepted into the SSD file space. Alternatively, the Warm Up phase can be conducted so that no existing page is overwritten and incoming pages are accepted if they satisfy a condition (e.g., a temperature threshold).

Once the SSD is full, and all available 32K blocks are consumed by the heaps, the Self Tuning phase starts. In the Self Tuning phase, existing pages are overwritten by incoming pages if the incoming pages' temperatures are higher than the existing pages. Also, at regular intervals 32K block exchanges are performed between different heaps to provide space for more valuable pages. Exemplary embodiments of these steps are described below.

Figure 5:
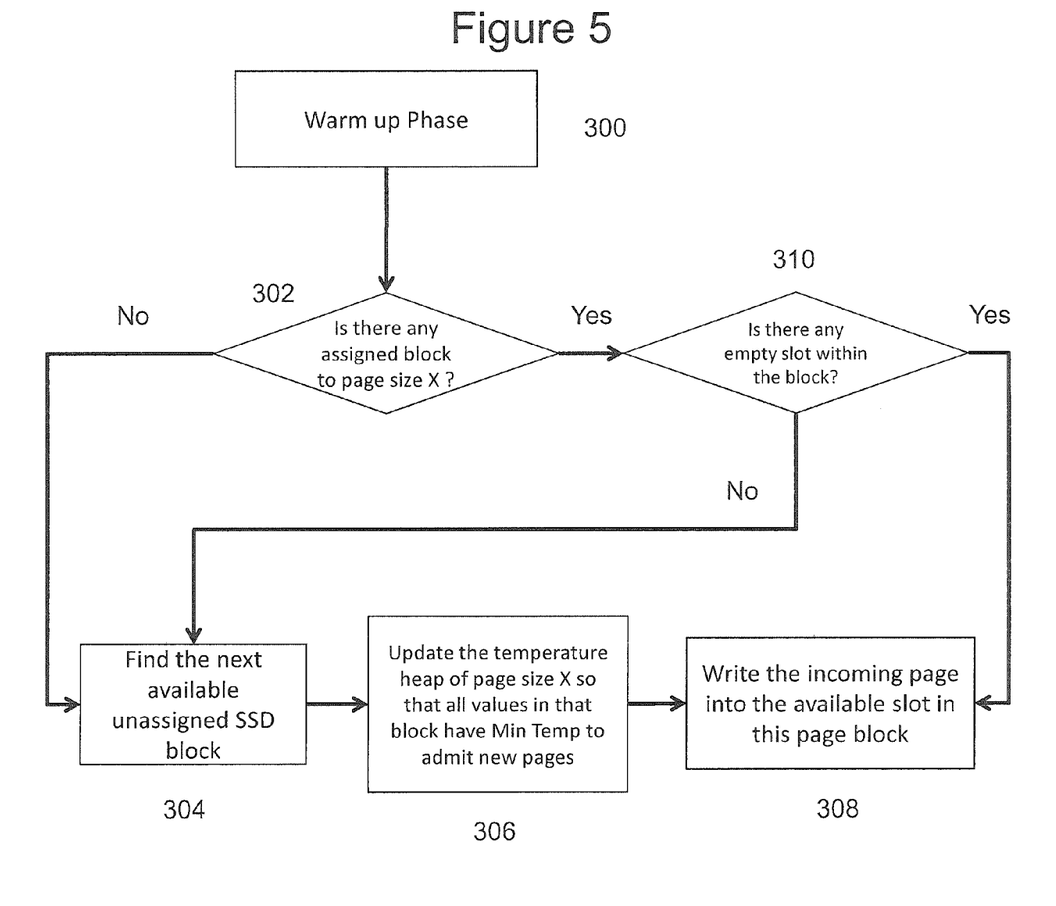
FIG. 5 illustrates the Warm Up phase of an exemplary embodiment.

In FIG. 5, the Warm Up phase (300) of an exemplary embodiment is depicted with a flow diagram. In this phase, the 32K blocks are distributed into four different heaps depending on the page size of the incoming pages to the SSD bufferpool.

When the first page is read from the disk (302), the first block of the SSD space is given to the heap of the page size of the page (304). For instance, if the first page read from disk is 8K then the first 32K block is given to the 8K heap. To do that, the heap elements of the 8K heap corresponding to the first four slots of the SSD space are found and their keys (temperatures) are initialized to −1 (Min Temp). Once the keys are updated, these four elements would go up in the heap (306). Now these elements can be used for four 8K pages to be stored in the first 32K block of the SSD space. In this example, the incoming page is stored at the very first slot of this block (308). There are now three available slots in this block ready for use for incoming 8K pages.

Suppose that the second page read from the disk is 16K. At this point, there is available space in the SSD file to write the second page, but the heaps need to be adjusted so as to admit the 16K page into the SSD space (304). Thus, the second block is allocated for the 16K heap, as the first block was used by the 8K heap. To do that, the heap elements in the 16K heap corresponding to the second block are found and their keys (temperatures) are similarly initialized to −1 (304). Once this is done, there are two available slots in the second 32K block which can accommodate two 16K pages. The incoming 16K page is stored in this block and its region temperature in the heap is updated (308). This operation is repeated until all of the SSD blocks are consumed by the heaps.

For example, if the next three pages are 8K pages, then for each, for the check to see whether there are any assigned blocks to the 8K heap the answer is yes (302). In this instance, as there are three 8K page slots available in the first block (310), the three pages are each assigned to the first SSD block with the original first 8K page (308).

If the subsequent page is also an 8K page, then, while there are blocks assigned to 8K pages (302), all four of the 8K slots in the first block are already occupied by 8K pages. Thus, the next unassigned SSD block can be assigned to the 8K heap (304) and the process proceeds as above.

Figure 6:
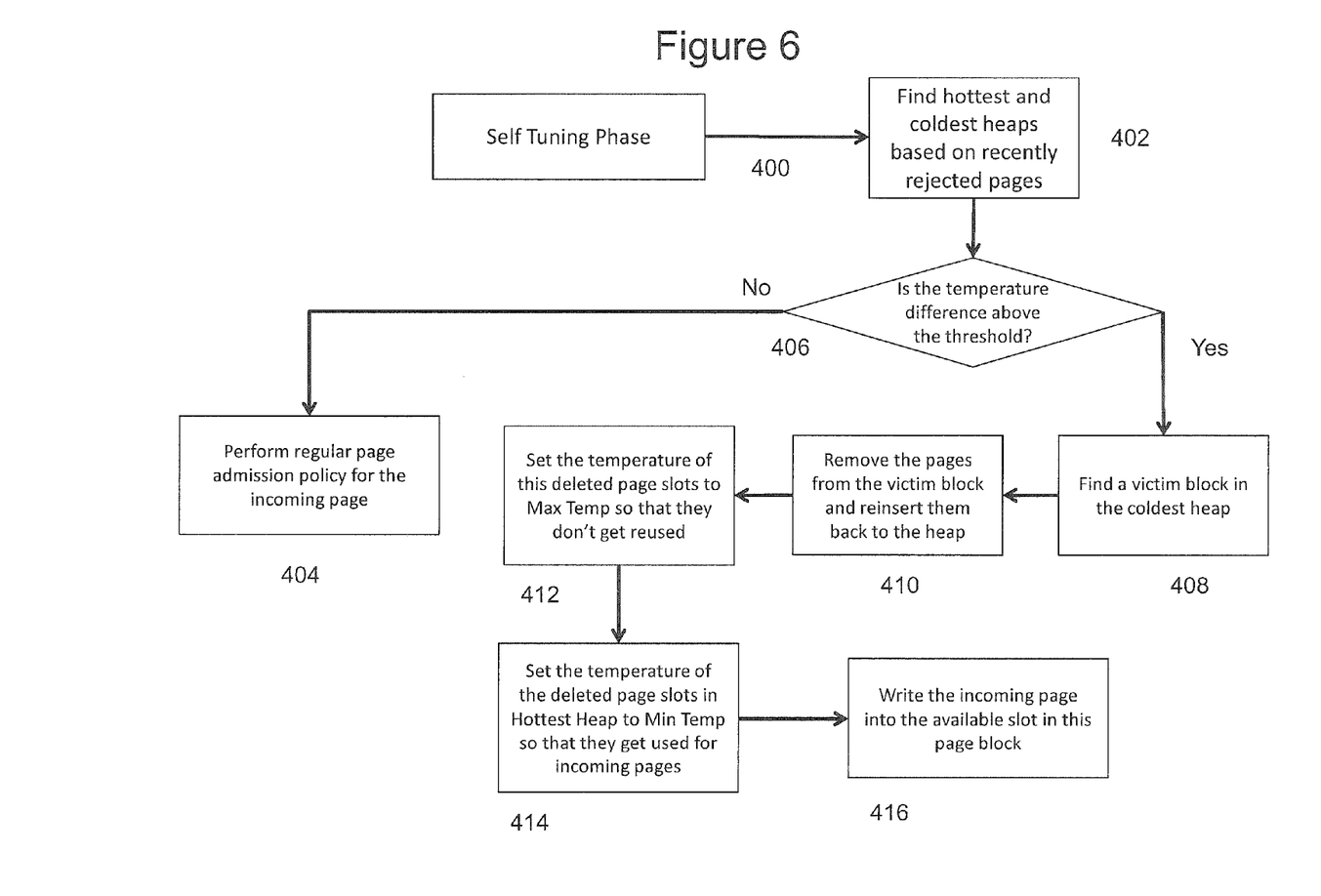
FIG. 6 illustrates the Self Tuning phase of an exemplary embodiment.

In FIG. 6, the Self Tuning phase of the method is depicted with a flow diagram. Once all of the blocks are consumed by the heaps, the Self Tuning phase begins (400). In an exemplary embodiment, the Self Tuning phase never terminates as long as the SSD bufferpool is used. In this phase, the heaps are continuously monitored and the blocks between the heaps are reallocated if necessary. Described below are the details of how an exemplary embodiment of the Self Tuning phase works.

At the end of the Warm Up phase, all of the blocks are consumed by the temperature heaps (e.g., all blocks are assigned to a heap). The incoming pages now have to use the existing blocks for page replacement. The Self Tuning (ST) mechanism keeps track of the average of the temperatures of the pages that are not admitted to the heaps in the last n accesses.

At regular intervals, the ST mechanism compares these average temperatures (402). A block is taken from the heap that rejected the coldest pages on average and is given to the heap which rejected the warmest pages, if the temperature difference is beyond a certain threshold (406). The threshold can be a ratio or percentage of temperatures or a set temperature difference. If a reallocation is not applied, then the regular page admission policy is applied without performing any page deallocation and reallocation (404). If the temperature difference is notable (e.g., over some dynamic or preset limit), then the reallocation is performed to make sure that the warmest pages are given higher preference for admission to the SSD bufferpool. The ST mechanism can be conducted after every predetermined period of time, or when some other condition is met such as number of pages written or accessed.

To victimize (recycle) a block from the coldest heap, the block containing the coldest page is found (408) and the pages in this block are reinserted into the heap if their temperature is higher than the topmost element of the heap (410). This will ensure that the pages being removed from the victim block can replace some other pages in some other blocks. The heap elements of the emptied block are set to Max Temp to send them down in the heap so as to guarantee that they won't get reused by incoming pages of an older page size (412). At the same time, the emptied block is given to the warmest heap (414). This process helps to rebalance the space allocated to the heaps so as to guarantee that the SSD space is used by the warmest pages.

Using the above system, the SSD(s) can be optimized to store, for example, frequently used, randomly accessed (non-sequential), information/data/pages on the hard drive. This can be done by tracking which pages are accessed randomly and which are accessed sequentially. The randomly accessed pages can be weighted higher than the sequentially accessed pages. This system can then rate the pages (e.g., a "temperature") based on number of times accessed and whether accessed sequentially. Such a system can leverage the ability of SSD to access non-sequential data much faster than conventional disk drives. Of course, the weighting of different values (e.g., times accessed verses sequentially accessed) does not have to be used. In addition, other weighting systems can be used using similar or entirely different variables, as needed, depending on the systems being serviced.

Figure 7:
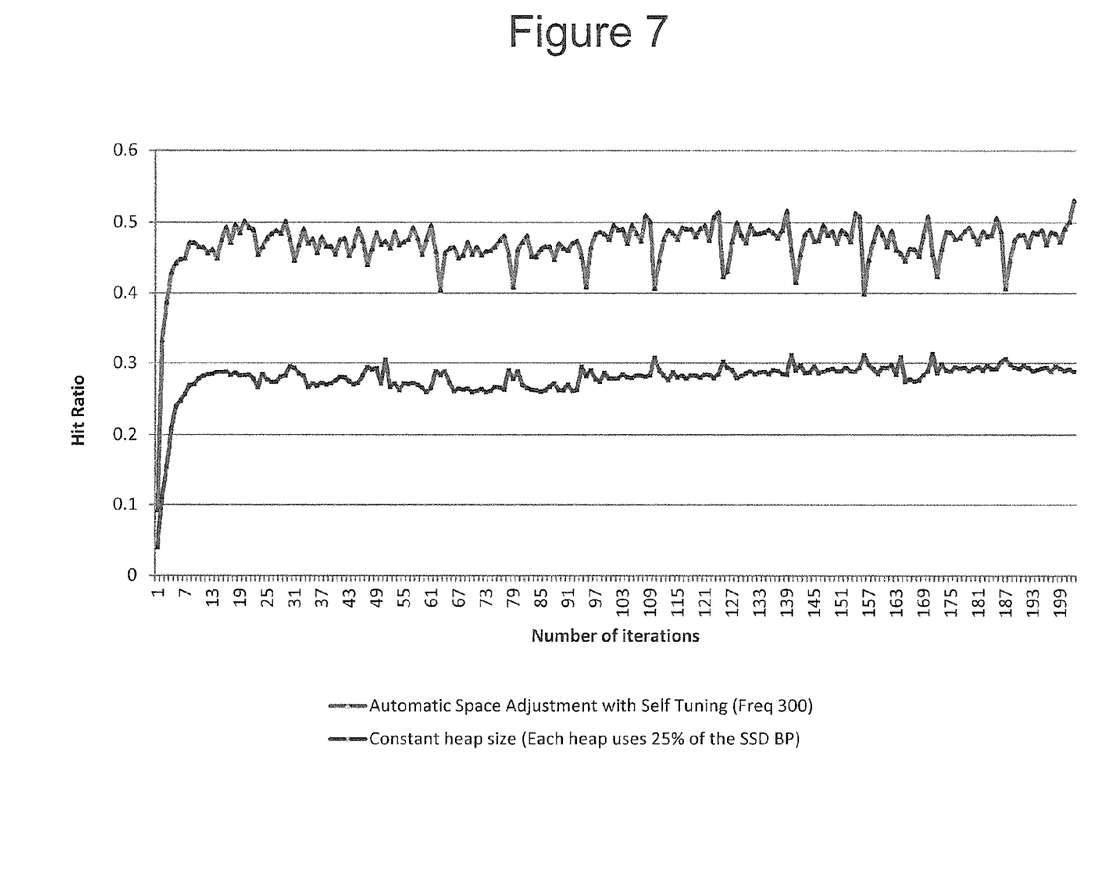
FIG. 7 illustrates an example of the hit ratio improvement provided by Self Tuning.

As illustrated in FIG. 7, the invention may allow a better hit ratio than alternative methods such as constant size allocation for different page sizes.

Figure 8:
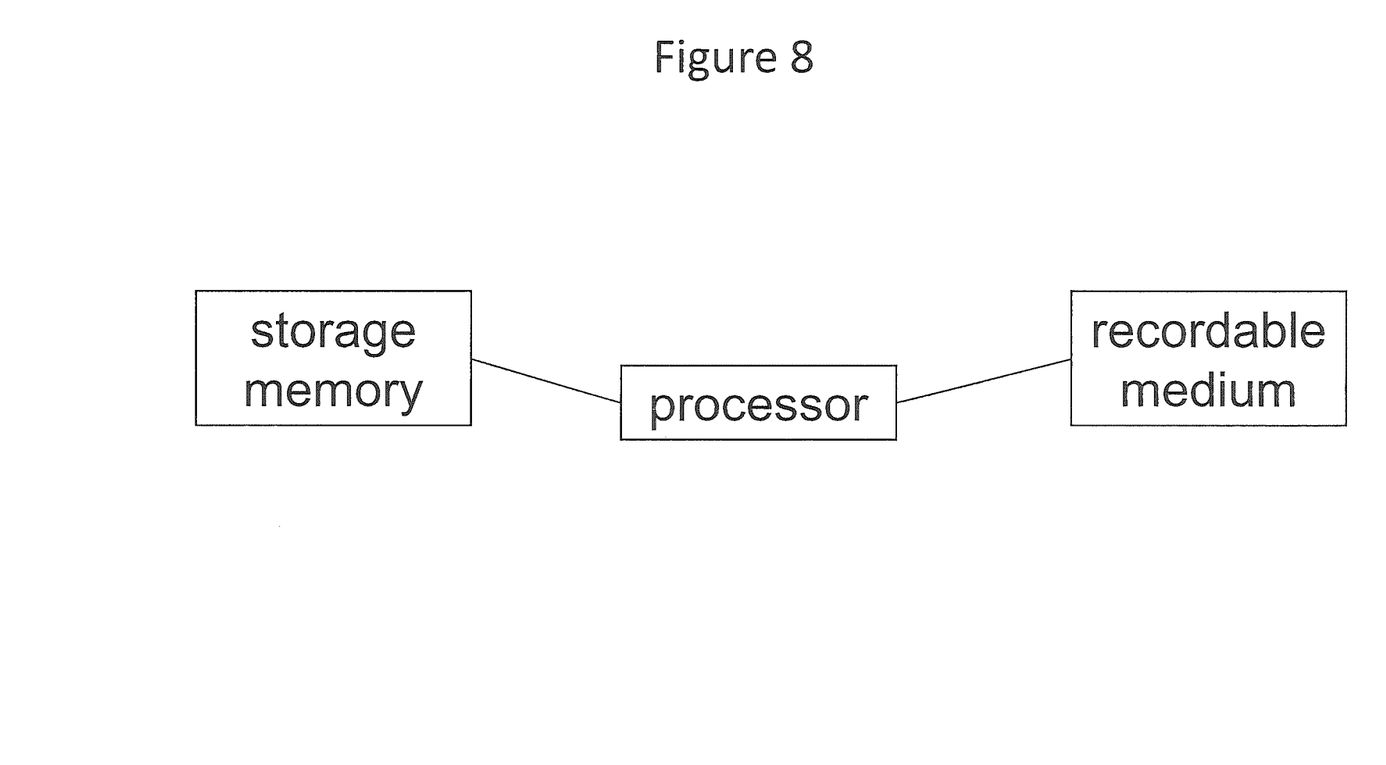
FIG. 8 illustrates an example of a memory system embodiment.

As illustrated in FIG. 8, an embodiment of the invention can includes a disk drive or some other storage memory, a recordable medium such as an SSD and a processor to control allocation of pages to the SSD. The processor can be integrated into any of the systems or provided separately and may be embodied as a multi-function computer processor or a dedicated circuit.

While the invention has been described in terms of exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

The invention claimed is:

1. A method of adjusting space allocated for different page sizes on a non-transitory recording medium, the method comprising:
   dividing the recording medium into multiple blocks such that a block size of the multiple blocks supports a largest page size of the different page sizes, and such that each of the multiple blocks is used for a single page size;
   assigning an incoming page to a block based on a temperature of the incoming page;
   creating temperature heaps for each page size; and
   if all of the blocks are assigned;
      checking for a highest rejected temperature for each page size to determine a coldest block; and
      converting the coldest block to another page size if a difference in the highest rejected temperature and a temperature of the coldest block is greater than a temperature threshold for admission.

2. The method according to claim 1, wherein the assigning the incoming page to the block further comprises, if all of the blocks are not assigned, assigning an unassigned block to a page size of the incoming page so as to create a new assigned block, with no consideration of the temperature or by applying a temperature threshold for admission.

3. The method according to claim 2, wherein the, assigning further comprises:
   determining if there is an assigned block for the page size and if there is an available slot within the assigned block, writing the incoming page to the available slot in the assigned block, with no consideration of the temperature or by applying the temperature threshold for admission; and
   if there is not an assigned block to the page size or if there is not an available slot within an assigned block to the page size, assigning the unassigned block to the page size of the incoming page so as to create the new assigned block, with no consideration of the temperature or by applying the temperature threshold for admission.

4. The method according to claim 2, further comprising:
   creating temperature heaps for each page size;
   after the assigning, updating a temperature of the new assigned block to a minimum temperature; and
   adding the incoming page to the new assigned block.

5. The method according to claim 1, wherein the converting the coldest block further comprises:
   removing pages from the coldest block and reinserting the pages into the temperature heaps;
   setting the temperature of the coldest block to a maximum temperature; and
   after a predetermined condition, setting the temperature of the coldest block to a minimum temperature.

6. The method according to claim 1, wherein the other page size comprises a page size of the highest rejected temperature.

7. The method according to claim 1, wherein the creating temperature heaps for each page size includes setting a temperature of each page slot to a maximum temperature.

8. A non-transitory computer-readable medium tangibly embodying a program of machine-readable instructions executable by an apparatus to perform a method of adjusting space allocated for different page sizes on a recording medium, the method comprising:
   dividing the recording medium into multiple blocks such that a block size of the multiple blocks support a largest page size of the different page sizes, and such that each of the multiple blocks is used for a single page size;
   assigning an incoming page to a block based on a temperature of the incoming page;

creating temperature heaps for each page size; and
if all of the block are assigned;
    checking for a highest rejected temperature for each page size to determine a coldest block; and
    converting the coldest block to another page size if a difference in the highest rejected temperature and a temperature of the coldest block is greater than a temperature threshold for admission.

9. The non-transitory computer-readable medium according to claim 8, wherein the assigning the incoming page to the block further comprises, if all of the blocks are not assigned, assigning an unassigned block to a page size of the incoming page so as to create a new assigned block, with no consideration of the temperature or by applying a temperature threshold for admission.

10. The non-transitory computer-readable medium according to claim 9, wherein, the assigning further comprises:
    determining if there is an assigned block for the page size and if there is an available slot within the assigned block, writing the incoming page to the available slot in the assigned block, with no consideration of the temperature or by applying the temperature threshold for admission; and
    if there is not an assigned block to the page size or if there is not an available slot within an assigned block to the page size, assigning the unassigned block to the page size of the incoming page so as to create the new assigned block, with no consideration of the temperature or by applying the temperature threshold for admission.

11. The non-transitory computer-readable medium according to claim 9, further comprising:
    creating temperature heaps for each page size;
    after the assigning, updating a temperature of the new assigned block to a minimum temperature; and
    adding the incoming page to the new assigned block.

12. The non-transitory computer-readable medium according to claim 8, wherein the converting the coldest block further comprises:
    removing pages from the coldest block and reinserting the pages into the temperature heaps;
    setting the temperature of the coldest block to a maximum temperature; and
    after a predetermined condition, setting the temperature of the coldest block to a minimum temperature.

13. The non-transitory computer-readable medium according to claim 8, wherein the other page size comprises a page size of the highest rejected temperature.

14. The non-transitory computer-readable medium according to claim 8, wherein the creating temperature heaps for each page size includes setting the temperature of each page slot to a maximum temperature.

15. A memory management system, comprising:
    a non-transitory recordable medium configured to store page data in page slots;
    a storage device configured to store the page data; and
    a processor configured so as to divide the recordable medium into multiple blocks such that a largest page size of different page sizes is supported by a block size of the multiple blocks, and such that each of the multiple blocks is used for a single page size, and to assign an incoming page to a block of the multiple blocks based on a temperature of the incoming page,
    wherein the processor receives temperature information related to the page data in the storage device, and is configured so as to create temperature heaps for each page size stored in the recordable medium, and
    wherein the processor is configured to analyze the recordable medium and if all of the blocks area assigned;
        determine a coldest block of the multiple blocks based on a highest rejected temperature for each page size;
        convert the coldest block to another page size if a difference in the highest rejected temperature and a temperature of the coldest block is greater than a temperature threshold for admission.

16. The system according to claim 15, wherein the processor receives temperature information related to the page data in the storage device, and is configured so as to create temperature heaps for each page size stored in the recordable medium, and
    wherein the processor is configured such that when the incoming page, which is stored in the storage device, is received:
        if there is an assigned block for a page size of the incoming page and if there is an empty slot within the assigned block, the incoming page is assigned to an available slot in empty slot, with no consideration of the temperature or by applying a temperature threshold for admission, and
        if there is not an assigned block for the page size of the incoming page or if there is not an empty slot within the assigned block for the page size, the processor assigns an unassigned block of the multiple blocks to the page size of the incoming page so as to create the new assigned block, with no consideration of the temperature or by applying the temperature threshold for admission.

17. The system according to claim 15, wherein the recordable medium comprises a solid state drive, and
    wherein the storage device comprises a drive having a read/write speed less than a read/write speed of the recordable medium.

* * * * *